May 5, 1942.  P. A. CONDIT  2,281,675
HYDRAULIC SPEED CONTROL SYSTEM FOR PRIME MOVERS
Filed Jan. 20, 1940  4 Sheets-Sheet 1

INVENTOR.
PAUL A. CONDIT.
BY
ATTORNEYS

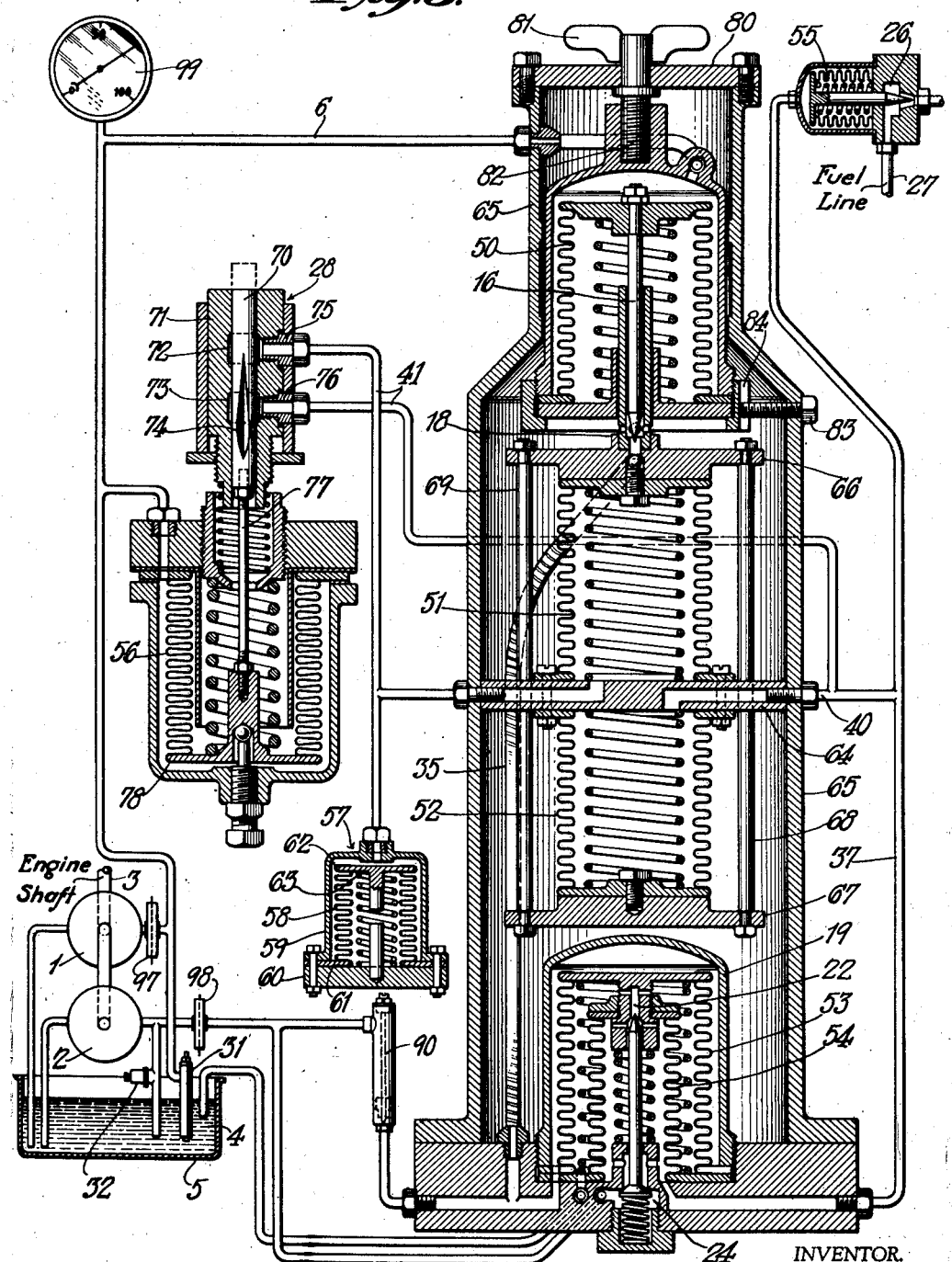

May 5, 1942.　　　P. A. CONDIT　　　2,281,675
HYDRAULIC SPEED CONTROL SYSTEM FOR PRIME MOVERS
Filed Jan. 20, 1940　　　4 Sheets-Sheet 3
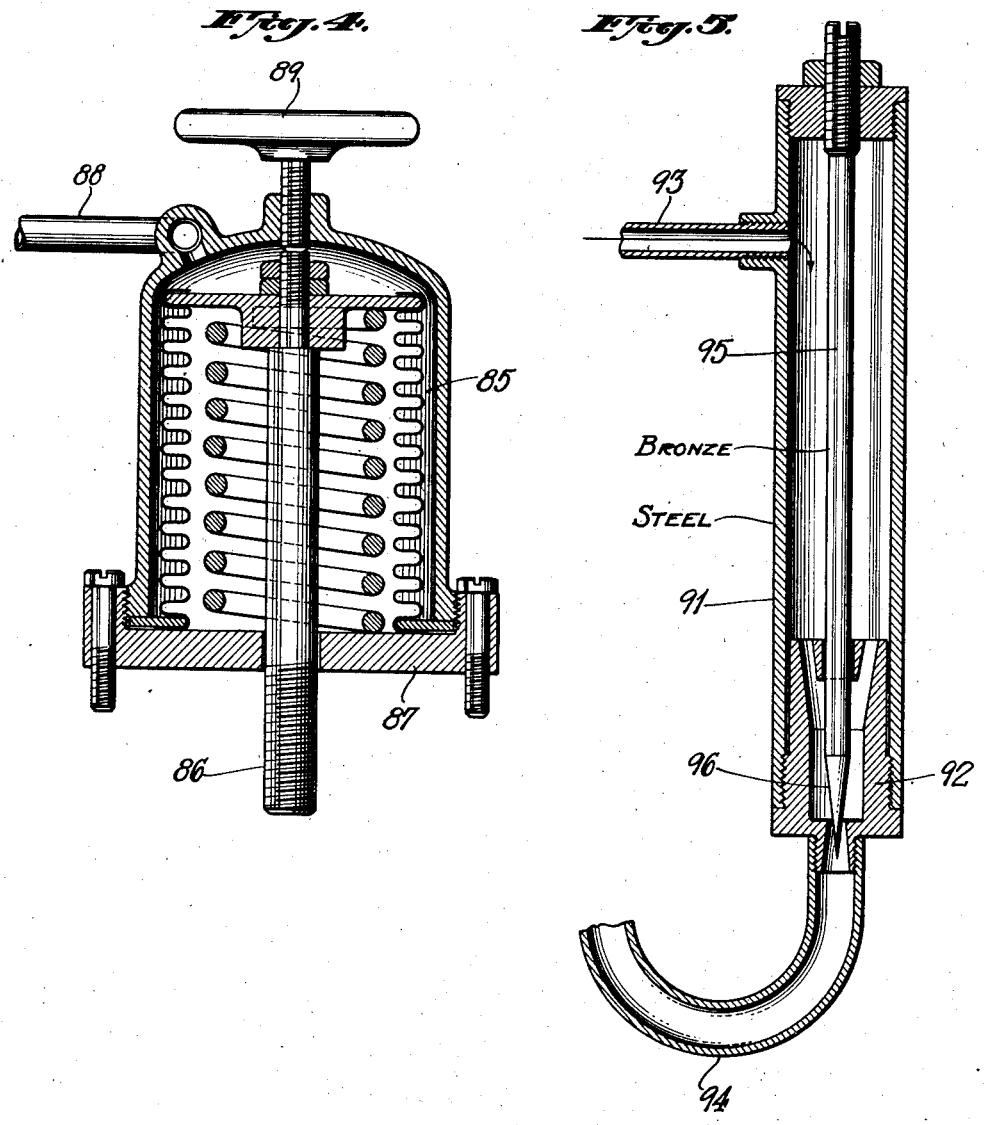
INVENTOR.
PAUL A. CONDIT.
BY
ATTORNEYS May 5, 1942.     P. A. CONDIT     2,281,675
HYDRAULIC SPEED CONTROL SYSTEM FOR PRIME MOVERS
Filed Jan. 20, 1940     4 Sheets-Sheet 4
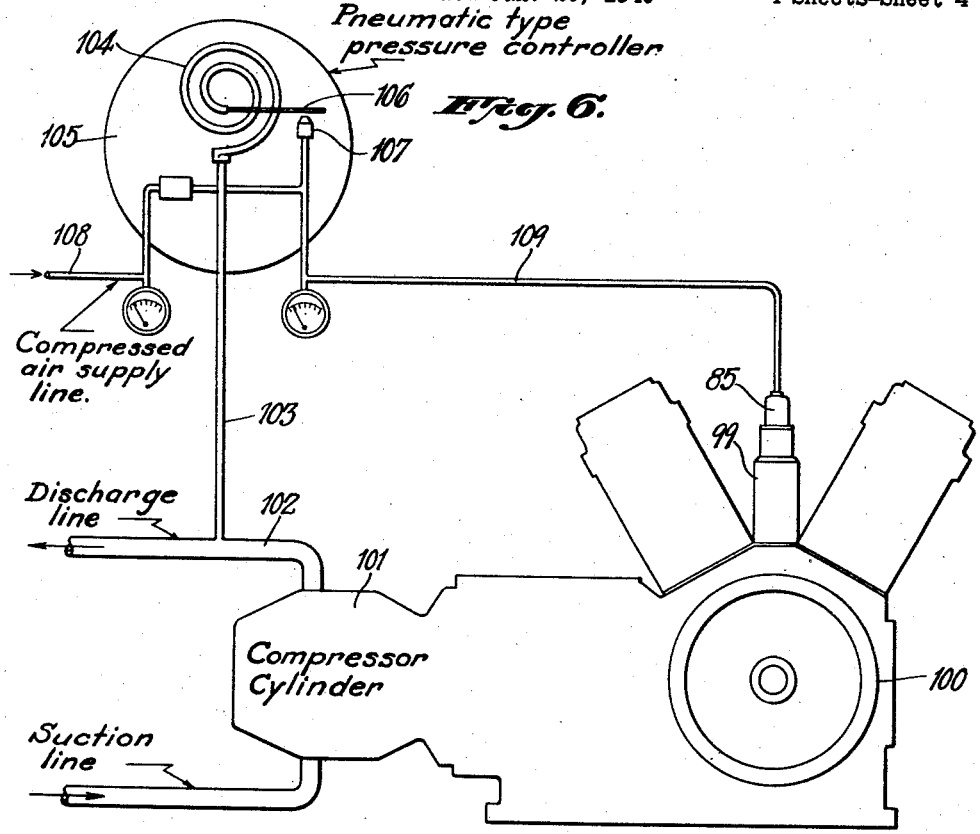
Fig. 6.
Fig. 7.
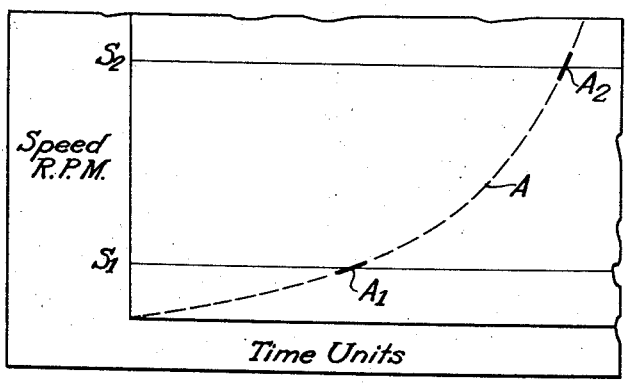
INVENTOR.
PAUL A. CONDIT.
BY
ATTORNEYS Patented May 5, 1942

2,281,675

UNITED STATES PATENT OFFICE 2,281,675

HYDRAULIC SPEED CONTROL SYSTEM FOR PRIME MOVERS

Paul A. Condit, Mount Vernon, Ohio, assignor to Cooper-Bessemer Corporation, Mount Vernon, Ohio, a corporation of Ohio Application January 20, 1940, Serial No. 314,739

17 Claims. (Cl. 264—3)

This invention pertains to speed control systems for prime movers, particularly internal combustion engines, such as Diesel engines.

A primary object of the invention is to provide a control system which is easily adjustable to maintain the engine speed substantially constant, irrespective of load changes, at any desired speed throughout the full operating range of the engine, and which automatically so adjusts itself in accordance with the speed of regulation or governing speed selected, as to eliminate hunting at all speeds.

For adjusting the governing speed from one value to another, but a single control element is required, which may be manually adjusted at the engine or from a remote point, such as a control panel, by means of hydrostatic pressure applied through a small tube. Alternatively, the latter expedient may be employed to place the speed under control of some factor in a system served by the prime mover, as for example, the pressure in the discharge line of a compressor driven by the prime mover, whereby the speed of the prime mover is automatically adjusted to hold the discharge line pressure constant, etc.

The control system of the invention marks a radical departure from conventional systems of prime mover governing, in that no fly-balls, mechanical linkages or the like, are required for speed-change detection, but to the contrary, the system is fully hydraulic in its operation throughout, speed adjustment and regulation being effected by means of valve actuating resilient diaphragms or bellows subjected to hydrostatic pressure.

The control system of the invention has no "droop" with increasing load, but will maintain the engine speed practically constant, i. e., within about plus or minus 1%, irrespective of load fluctuations.

The response of the system to speed fluctuations from the governing speed, is at all times in place or in step with the changes in speed and is automatically so adjusted both as to rapidity, intensity and duration of response in relation to the governing speed selected as also to be in place or step with the engine acceleration at such speed, whereby hunting is eliminated at all speeds. In this respect, the invention constitutes a radical departure from all known types of governing systems of which I am aware, in that known types of governing systems are either inherently incapable of response adjustment for different governing speeds, or require tedious manual adjustments for appropriate changes in response, each time the governing speed is changed.

It is well known that the acceleration of most prime movers is not constant throughout the speed range thereof, but in general increases with speed until the top or no-load speed is approached. If, for example, the pick-up speed of a Diesel engine is plotted against time, starting from a condition of rest, it will be found that the speed increases roughly as the square of the time, with consequent increase in acceleration rate with speed. As a result of this increased acceleration rate at the higher speeds, the engine will change speed more rapidly and in response to much smaller load fluctuations when running at an initially high speed than at some lower speed. Conversely, if the engine speed is to be held substantially constant and free from hunting under a fluctuating load, regulating apparatus must be employed capable of providing a compensating response which increases in rapidity and decreases both in intensity and duration of response as the governing speed is increased. Otherwise, the governing action will in general be either too rapid or too sluggish and either too pronounced or insufficient to stabilize the engine at the desired governing speed, so that continual hunting will ensue.

Existing systems of speed control are inherently incapable of fulfilling these requirements and hence are productive of serious hunting. For example, the response of the simple fly-ball type of governor is fixed and invariable by reason of its mechanical construction, so that it is inherently adapted to provide reasonably good regulation only at but one particular speed determined by its design. If adjusted, as by means of a change in spring tension or otherwise, to effect regulation at some other speed, hunting will result for reasons above stated.

The simple fly-ball type of governor is subject to the further disadvantage that it cannot provide close regulation. This results from the fact that the throttling action is directly dependent on the position of the fly-balls, which in turn is directly dependent on the speed, so that an appreciable change in speed is required to produce appreciable governing action. For this reason, the speed of regulation decreases as the load increases. This type of governor does, however, possess the desirable characteristic of automatically decreasing the compensating action as the engine speed returns to the regulation value, because the position of the fly-balls is at all times precisely determined by the speed.

Various schemes have been proposed for effecting closer regulation with fly-ball type governors, such for example as by causing slight displacements of the governor to one side or the other of a control point, to apply hydrostatic pressure to one side or the other of a piston actuating the engine throttling valve. Such "isochronous" governors have, however, the serious disadvantages that the governing action is not automatically decreased as the speed returns to the control point so that hunting results. Also hunting is intensified by the fact that the intensity and duration of the governor response is, by reason of its mechanical construction, in general independent of the engine speed at which regulation is to be effected. Although refinements, such as bleeder type dash pots, etc., have been added for adjusting the governor response in relation to the speed of regulation, they require careful manual adjustment for each such speed, and hence are objectionable.

In accordance with the fundamentals of construction of the present invention, which eliminates such defects, an oil pump, directly driven by the prime mover and pumping oil through small diameter copper tubing, provides a source of hydrostatic pressure which is variable and which increases in direct proportion to the engine speed. This pressure is applied to a resilient diaphragm carrying preferably the closure member of a needle type speed regulating valve having a separately mounted orifice member cooperating therewith to effect valve closure. A second pump, driven by the prime mover, is arranged to provide an auxiliary source of hydrostatic pressure which is substantially constant, irrespective of the engine speed. Pressure from this auxiliary source is applied under control of the speed regulating valve closure, to a diaphragm actuated differential valve and through it to a similarly actuated engine throttling valve, whereby closure of the throttling valve is under control of the speed regulating valve.

With this arrangement, the speed at which the engine tends to stabilize, will be determined by the initial opening of the speed regulating valve, that is to say, by the initial setting of its closure member in relation to its orifice member. The valve is so arranged, as explained hereinafter, that the valve closure may be altered independently of the action of the variable pressure source thereon, whereby the governing speed or speed of regulation may be adjusted to any desired value throughout the full operating range of the engine.

Once the engine has adjusted itself to the governing sped as thus determined, further increases or decreases in speed, produced for example by load fluctuations, will, by correspondingly varying the hydrostatic pressure applied from the variable source to the speed regulating valve, cause the latter to react in such a way on the engine throttling valve through the medium of the auxiliary pressure source and the differential valve, as to restore the engine to its governing speed.

The system as thus arranged will, however, have a tendency to hunt, because its rapidity, duration and intensity of response to speed fluctuations, is in general independent of the governing speed. This difficulty is eliminated, in accordance with the invention, by resiliently mounting the orifice member of the speed regulating valve on a second pressure actuated diaphragm which is separate and distinct from that resiliently supporting the closure member of this valve. This second diaphragm is arranged to respond to opposed components of the pressure applied to the throttling valve, a relatively unrestricted component directed to oppose changes in the throttling valve pressure, and an oppositely directed component applied through a restricted orifice of a timing valve. By appropriately adjusting the opening of the timing valve in relation to the governing speed, displacement of the speed regulating valve orifice member can be so controlled and timed in relation to an initiating displacement of its closure member, as to so adjust the duration and intensity of response of the system in relation to the governing speed, as to eliminate hunting.

The timing valve may be manually adjusted at each governing speed to produce this result. In accordance with a preferred embodiment of the invention, however, this adjustment is made automatic by mounting the closure member of the timing valve on a resilient diaphragm which responds to the source of hydrostatic pressure varying with the engine speed, the arrangement being such that the opening of the timing valve increases with the engine speed at just the proper rate to effect the result above stated.

In the drawings:

Fig. 3 is an embodiment of the invention as employed in practise and using pressure actuated bellows instead of diaphragms for valve action, the bellows and valves being shown in axial section and the remainder of the system diagrammatically.

Fig. 4 is an axial section of a pressure actuated bellows attachable to the Fig. 3 modification for providing remote or automatic adjustment of the governing speed.

Fig. 5 is a valve element having a temperature compensated orifice in accordance with one aspect of the invention.

Fig. 6 is a diagrammatic layout illustrating the invention as applied to an engine driven compressor for automatically adjusting the engine speed to maintain constant pressure in the compressor discharge line.

Fig. 7 is a graph illustrating the variation with time of the pick-up speed of a prime mover, such as a Diesel engine.

Figure 1:
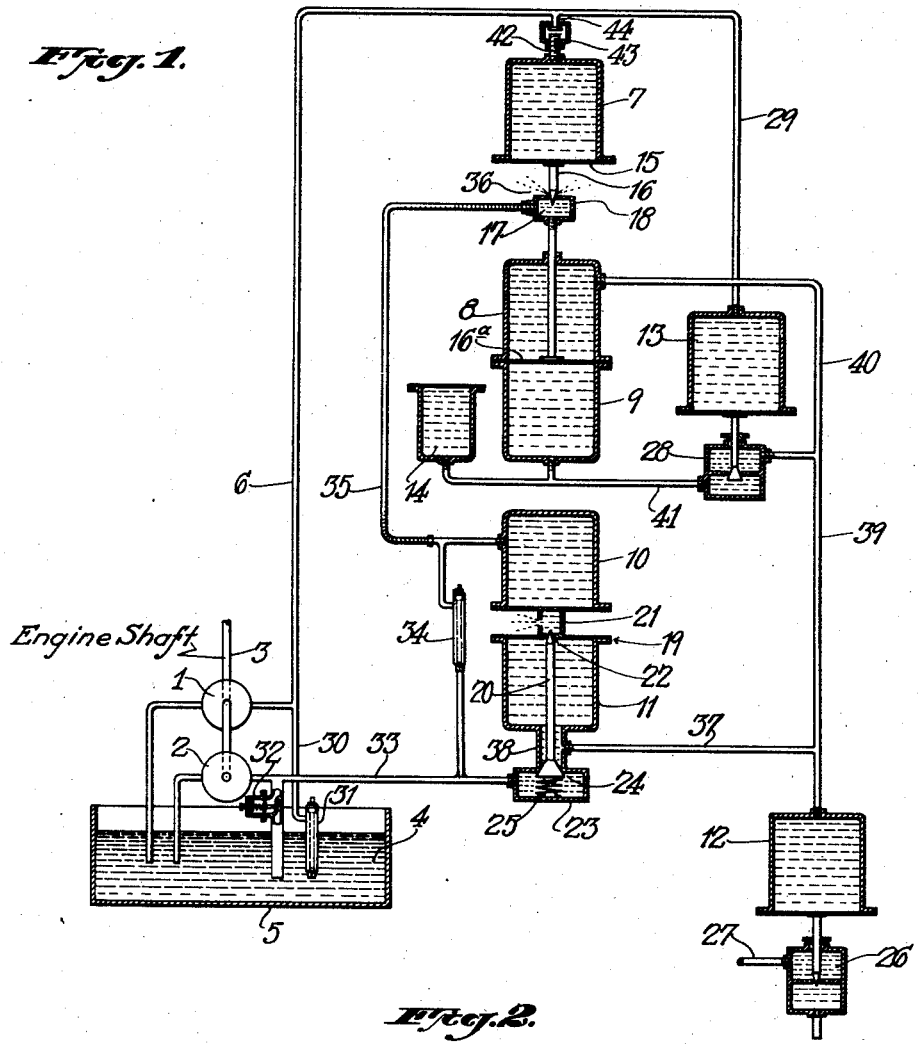
Fig. 1 is a schematic layout of a simplified system in accordance with the invention in which the valves are controlled by pressure actuated resilient diaphragms of pressure chambers shown in axial section as are also the valves.

Referring to Fig. 1, a pair of positive displacement pumps 1, 2, directly or gear driven by the engine shaft 3, pump oil 4 from a sump 5 through a system of small diameter copper pipes or tubes, such as 6 of about ⅛ inch inside diameter, to a series of pressure chambers 7 to 14, inclusive, each of which is closed at one end by means of a resilient diaphragm, such as 15, 16a, which is axially displaceable by hydrostatic pressure created in the chamber. Secured to the diaphragms 15 and 16a respectively, are closure and orifice members 16, 17 of a needle-type speed regulating valve 18, whereby the closure member responds to movements of diaphragm 15 while the orifice member responds independently to movements of diaphragm 16a. The closure member 17 responds to opposed pressures in chambers 8 and 9, due to its mounting on diaphragm 16a separating these chambers.

Chambers 10, 11 jointly control the operation of a differential valve 19 containing a valve stem or closure member 20, conically pointed at its upper end and cooperating with an orifice member 21 to provide one valve closure 22, said closure member 20 having an enlarged frusto-conical head at its lower end which cooperates with a second orifice member 23 to provide a second valve closure 24. The closure member 20 is normally maintained in the position shown by a compression spring 25. Orifice member 21 is disposed between and rigidly secured to the diaphragms of chambers 10 and 11, so that these diaphragms must move in unison, whereby an excess of pressure in chamber 10 will force the orifice member 21 downward and with it the valve stem 20 against the action of spring 25 thereby to open the lower valve 24. On the other hand, an excess of pressure in chamber 11 will force its diaphragm and with it the orifice member 21, upward and away from stem 20 thereby to open the upper valve 22.

The diaphragm of chamber 12 carries the closure member of a needle-type throttling valve 26 disposed in the fuel supply line 27 of the prime mover, the arrangement being such that closure of valve 26 increases with the pressure in chamber 12. The diaphragm of chamber 13 carries the closure member of a timing valve 28, the arrangement being such as shown, that the valve opening increases with pressure in chamber 13.

Chambers 7 and 13 are supplied over pipes 6 and 29 with hydrostatic pressure from pump 1, pressure from which increases, as stated, in direct proportion to the engine speed. This is due to the positive displacement type of pump employed, its direct drive by the engine shaft, and its by-pass return 30 to the sump 5 through a valve 31 having a temperature compensated orifice as described hereinafter. Therefore, as the engine speed increases, the speed regulating valve 18 is increasingly closed and the timing valve 28 is increasingly opened.

The remaining chambers 8 to 12 inclusive, are supplied directly or indirectly with hydrostatic pressure from pump 2. This pump is provided on its outlet side with a by-pass return to the sump containing a pressure actuated relief valve 32 closed by a spring providing constant compression, for maintaining a constant pressure of about twenty pounds per square inch, in the outlet pipe 33.

This pump supplies hydrostatic pressure through a valve 34 (preferably of the temperature compensated orifice type above referred to) to chamber 10 of the differential valve, which pressure is regulated by a by-pass flexible pipe connection 35 extending from chamber 10 to the orifice member 17 of the speed regulating valve 18, through which the oil bleeds out at atmospheric pressure, as indicated at 36, and is returned to the sump by means not shown. The pressure in chamber 10, therefore, depends on the opening of valve 18.

Pressure is also supplied from pump 2 to the orifice member 23 of lower differential valve closure 24, and through it and over pipe 37 to chamber 12 of the throttling valve, and also the lower chamber 11 of the differential valve, to the latter through the enlarged neck 38 surrounding the valve stem 20.

The pressure thus created in the throttling valve chamber is applied over pipes 39, 40 directly to the upper chamber 8 acting on diaphragm 16a, and this pressure is also applied indirectly to the lower chamber 9 acting thereon, to the latter over pipe 39 and through the restricted orifice of the timing valve 28 interposed in pipeline 41. Owing to this arrangement, diaphragm 16a is subjected to opposed components of the throttling valve pressure, an unrestricted component applied to its upper surface and a restricted component applied to its lower surface through the timing valve orifice. The deflection of this diaphragm will, therefore, depend on the difference in pressure exerted on its two faces, and since the diaphragm carries the orifice member 17 of the speed regulating valve 18, the opening of this valve will, at any given instant, depend on the pressures in the three chambers 7, 8 and 9. Chamber 14 is merely a resilient loading chamber to care for oil displaced from chamber 9 by movement of diaphragm 16a.

The operation of this system will be most easily grasped by first considering the control that would be effected if the diaphragm 16a, timing valve 28 and the appurtenant pressure chambers 8, 9, 13 and 14 were omitted, and the orifice member 17 of the speed regulating valve 18 were rigidly supported. With this assumption, consider the operation as the engine is brought up to the control speed from a condition of rest.

Prior to starting, the interiors of the various chambers are at substantially atmospheric pressure owing to bleeder and leakage effects and to the fact that the pumps are not running. The speed regulating and throttling valves 18, 26 will, therefore, be open to the maximum extent. As the engine gathers speed, the pressure in chamber 7 will increase proportionally and correspondingly increases the closure of valve 18. Meantime, pump 2 will have established a constant pressure in pipe 33, which, operating through bleeder valve 34, will produce a pressure in chamber 10 that increases with increasing closure of valve 18 due to reduction in the by-pass pressure escape through pipe 35 and valve 18. As the pressure increases in chamber 10, the deflection of its diaphragm acting through the orifice member 21 onto stem 20 of the differential valve, will open the lower closure 24 thereof against the restraining action of spring 25. Pressure from pump 2 will accordingly be simultaneously applied over pipe 33 and through valve 24 to the lower chamber 20 of the differential valve and also to chamber 12 of the throttling valve. The throttling valve will thus start to close and reduce the fuel supply, but this action will be arrested at a value approximating that required to maintain the governing speed, owing to the pressure built up in chamber 11 which, by opposing that in chamber 10 as regards its action on the chamber diaphragms, permits the valve stem 20 to seat again in orifice member 23 and thus close valve 24. Should the governing apparatus overshoot its mark and permit too high a pressure to be built up in chambers 11 and 12 to secure this result, the excess pressure will be relieved by atmospheric escape through valve 22, due to continued upward deflection of the diaphragm in chamber 11 following seating of the valve stem 20.

The governing speed at which the engine will tend to stabilize is determined by the initial opening of the speed regulating valve 18. For adjusting this opening, chamber 7 is supported upon a stud 42 threaded into a sleeve member 43 which is rotatably secured to a flanged terminus 44 of pipe 6. Chamber 7 carrying the valve stem 16 may thus be adjusted up or down by rotating sleeve 43, thereby to vary the initial opening of valve 18 and secure a desired governing speed.

After the engine has attained its governing speed in the manner above described, should it suddenly tend to speed up further, due for example to a load fluctuation, each increment of speed will produce a corresponding increment of pressure in chamber 7 to correspondingly increase the closure of valve 18. Pressure in chamber 10 will thus increase, causing valve 24 to open and increase the pressure in chamber 12, thereby to throttle the engine down, and this will continue until pressure in chamber 11 is sufficient to close valve 24.

Should now the engine tend to slow down unduly, pressure in chamber 7 will fall and increase the opening of valve 18. Pressure in 10 will, therefore, fall below that required to hold valve 22 closed against the opposing pressure in chamber 11, whereupon this valve will open to reduce the pressure in chambers 11 and 12. Reduction of pressure in 12 in turn increases the opening of the throttling valve to increase the fuel supply, thereby to speed up the engine.

The system as described thus far has in general a tendency to hunt for reasons explained at the outset, namely, that the response of the governing system is fixed by its mechanical construction and hence does not in general conform in speed, intensity and duration of response, to the rate at which the engine tends to accelerate or decelerate at any particular governing speed. Referring for example to Fig. 7, curve A illustrates graphically the pick-up speed of a Diesel engine in revolutions per minute (R. P. M.) plotted against time, starting from a condition of rest. The slope of this curve gives the acceleration or deceleration rate at any particular speed, such as $S_1$ or $S_2$. It will be noted that the acceleration rate $A_1$ at speed $S_1$ is much lower than that of $A_2$ for speed $S_2$. Therefore, a governing system having the proper rapidity, intensity and duration of response to stabilize the engine without hunting at the speed $S_2$, would produce marked hunting if employed at a governing speed of $S_1$, because its response to speed fluctuations would be too rapid and too pronounced at the lower speed.

In the Fig. 1 system, hunting is automatically eliminated at all governing speeds by the resilient mounting of the regulating valve orifice member 17 on diaphragm 16a, and by subjection of this diaphragm to opposed components of the throttling valve pressure, the component directly applied through chamber 8 and the opposed component indirectly applied through the restricted orifice of the timing valve 28 and chamber 9.

Figure 2:
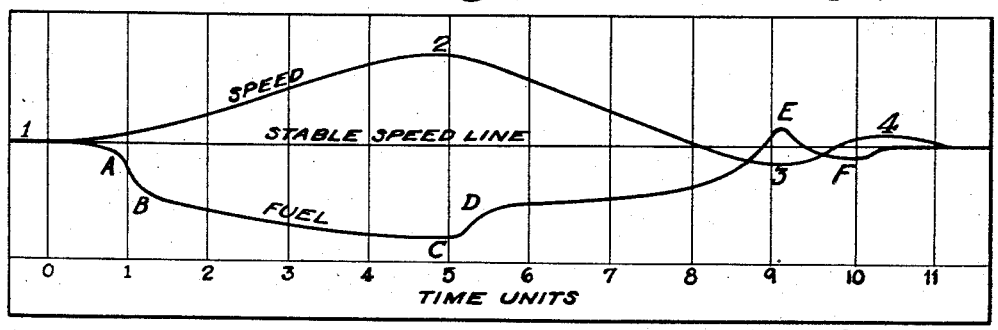
Fig. 2 is a graphical chart showing the manner in which the system of the invention varies the fuel supply of a prime mover in response to fluctuations in speed from the governing speed.

Referring to Fig. 2, assume that the engine has been running along at a constant speed corresponding to the "stable speed line" and that at time zero it starts to speed up in accordance with the curve portion 1—2, due for example to a sudden reduction in load. The increase in speed will immediately be translated in terms of increased pressure in chamber 7 thus increasing the downward deflection of diaphragm 15 to increase the closure of valve 18.

Pressure will accordingly increase in chamber 10 of the differential valve, which will open at its lower closure 24 to apply pressure from pump 2 to chamber 12 controlling the throttling valve 26. The closure of the throttling valve will be rapidly increased by this pressure and hence will rapidly reduce the fuel supply in accordance with the portion A—B in the "fuel" graph of Fig. 2.

Meantime, however, the pressure in chamber 12 is being applied over pipes 39, 40 to the upper chamber 8 acting on diaphragm 16a and over pipes 39, 41, and through the timing valve 28 to the lower chamber 9 acting thereon. Since the pipeline to the upper chamber 8 contains no constriction, pressure in this chamber will build up more rapidly than in the lower chamber 9, pressure to which must be supplied through the constriction of the timing valve. Accordingly, at the time corresponding to point B, Fig. 2, on the fuel graph, diaphragm 16a will be deflected downward rather rapidly by the excess pressure in upper chamber 8, and this will cause the orifice member 17 of the speed regulating valve to back away to some extent from the closure member 16 which is still advancing toward it due to the fact that the engine speed is still increasing as shown in Fig. 2. This movement of the orifice member 17 in a direction away from the advancing closure member 16, reduces the rate at which valve 18 continues to close thereafter, and this decreasing rate of closure of valve 18 is reflected through its action on the differential valve 19 and throttling valve chamber 12 into a decreasing rate of closure of the throttling valve 26 and hence into a decreasing rate of reduction of the fuel supply as shown by the portion BC, Fig. 2, of the fuel graph.

It will be observed further in portion BC of the fuel graph that the rate of decrease becomes increasingly smaller until at about point C, the curve becomes horizontal showing that no further fuel reduction is occurring. This is brought about by two factors. The first is that the increasing reduction of the fuel supply offsets increasingly the continued tendency of the engine to speed up with the result that its speed approaches a maximum at point 2, thus arresting advance of the regulating valve closure member 16 toward the orifice member 17. The second factor is that the pressure building up in the lower chamber 9 gradually equalizes the pressure on both sides of diaphragm 16a and thus restores the orifice member 17 to its initial position.

As the engine passes its maximum speed 2, Fig. 2, and starts to return toward the speed of regulation in accordance with the portion 2—3 of the speed graph, the actions above described are reversed. The reduction in speed produces a proportional pressure reduction in chamber 7 which causes closure member 16 of the regulating valve to back away from orifice member 17, thus reducing the pressure in chamber 10 of the differential valve. This creates an excess of pressure in chamber 11 which escapes through closure 22 thereby reducing the pressure in the throttling valve chamber 12, causing the throttling valve to open rapidly and increase the fuel supply in accordance with the portion CD of the fuel graph, Fig. 2.

Meantime, the pressure reduction in chamber 12 is rapidly conveyed to chamber 8 to produce an upward deflection of the diaphragm due to the excess pressure thus created in chamber 9, Orifice member 17 thus moves toward the still receding closure member 16 of the speed regulating valve, thereby reducing the rate of increase of the fuel supply in accordance with portion DE of the fuel graph. Ordinarily, the engine speed will not be stabilized at the governing speed on its first approach, but will oscillate a few times about the stable speed as shown by portion 3, 4 of the speed graph. However, as the engine passes from the maximum speed 2 to the minimum speed 3, the movement of the regulating valve stem 16 away from the closure member 17 will be arrested while meantime the pressure in the lower chamber 9 will be reduced to that in 8 again restoring the orifice member 17 to its initial position, the net effect being that at speed 3, Fig. 2, valve 16 is open slightly more than it was initially, producing thereby a net change in the fuel supply as shown by portion DE of the fuel graph. The action above described is merely repeated as the speed fluctuates over cycles 3, 4, Fig. 2, before stabilizing.

It will be observed from the above explanation that the resiliently supported orifice member 17 is in effect subjected to opposed components of the throttling valve pressure, a relatively unrestricted component applied to diaphragm 16a through chamber 8, and a relatively restricted component applied to the diaphragm through the timing valve 28 and chamber 9. It will be noted, moreover, that the unrestricted component is always in a direction to oppose change in the throttling valve pressure. If, for example, the throttling valve pressure is being increased due to increasing closure of the regulating valve 18, pressure in chamber 8 will also increase and cause orifice member 17 to back away from closure member 16 tending thereby to prevent further increase in the throttling valve pressure, the reverse being true for a decrease in pressure.

The intensity and duration of response of diaphragm 16a and with it orifice member 17 to changes in the throttling valve pressure, is determined by the opening of the timing valve 28. As this valve is increasingly opened, the intensity and duration of response decreases due to the increasing rapidity with which pressure changes in the upper chamber 8 are reflected in the lower chamber 9. Conversely, a decrease in aperture of the timing valve increases the intensity and duration of compensation owing to the increasing restriction to pressure changes in chamber 9 provided by the timing valve.

Therefore, by appropriately adjusting the timing valve opening in relation to the governing speed, hunting may be eliminated throughout the entire speed range of the engine. This adjustment may be accomplished manually, but preferably it is made automatic as in Fig. 1, by subjecting chamber 13 to pressure from pump 1 which increases with speed. Accordingly, as the engine speed increases, the timing valve is increasingly opened automatically to reduce the intensity and duration of the compensation. By appropriately shaping the closure characteristics of the timing valve, as explained hereinafter, the closure of this valve will be automatically varied with governing speed, in just the right proportion to eliminate hunting at all speeds.

Fig. 3 illustrates a preferred practical embodiment of the invention. The layout and operation of the system are the same as in Fig. 1. The only important difference is that the diaphragm actuating pressure chambers 7 to 13 inclusive of Fig. 1 are supplanted in Fig. 3 by bellows 50 to 57 inclusive, respectively. The bellows control the various valves and are pipe connected to the pumps 1, 2 and to each other in the same way as in Fig. 1, as is shown by the elements similarly designated in each figure.

Each bellows, referring for example to the loading bellows 57, comprises a thin sheet metal bellows 58 of bronze for example, disposed within a rigid metal housing 59 to the base 60 of which one edge 61 of the bellows is secured in a fluid tight seal, the opposite end of the bellows being similarly closed by a floating diaphragm 62. Disposed axially within the bellows is a helical compression spring 63 which maintains the bellows normally distended. Hydrostatic pressure may be applied to the interior or exterior of the bellows as desired; to the exterior as with bellows 50, 53, 55, 56 and 57, and to the interior as with bellows 51, 52 and 54.

The compensating bellows 51, 52 are oppositely mounted on a rigid central support 64 secured to housing 65, with the free or floating diaphragm ends 66, 67 of the bellows rigidly bolted together by means of tie rods 68, 69, so that the diaphragms move as a unit. Diaphragm 66 carries the orifice member 17 of the speed regulating valve 18.

Fig. 3 shows a preferred construction of the timing valve 28. It comprises a rod 70 axially displaceable within a sleeve 71. The inner surface of the sleeve is provided with a pair of spaced peripheral grooves 72, 73 and the rod is provided with longitudinal groove 74 of sufficient length to variably overlap the peripheral grooves 71, 72, as rod 70 is axially displaced within the sleeve. Axially drilled bushings 75, 76 threaded into sleeve 71, communicate with the peripheral grooves 72, 73 therein respectively. Inlet and outlet sections of pipe line 41 connect to these bushings respectively, as shown. Rod 70 is rigidly secured by shaft 77 to diaphragm 78 of bellows 56, the outer surface of which is subjected over pipe 29 to the hydrostatic pressure of pump 1 which is proportional to the engine speed. Accordingly, as the governing speed is increased, rod 70 will be progressively displaced upward, causing groove 74 therein to overlap increasingly the peripheral grooves 72, 73, and in this way, provide an orifice of increasing aperture between the inlet and outlet sections of pipeline 41. It will be observed that groove 74 increases in width from its upper end to a point near its lower end for opening the valve at an increasing rate as the rod 70 is upwardly displaced. By properly shaping the groove as shown, the rate at which the valve is opening at any particular engine speed can be made to conform to the acceleration curve of the engine as shown in Fig. 7, whereby hunting will be automatically eliminated at all governing speeds throughout the entire operating range.

For manually adjusting the governing speed, a cover plate 80, mounting a rotatable wing bolt 81, is bolted to the bellows housing 65, with the wing bolt partially threaded into the upper terminal bushing 82 of bellows 50. Rotation of the wing bolt thus raises or lowers the bellows to open or close the regulating valve in accordance with the governing speed desired. To prevent rotation of the bellows during this operation, a bolt 83 threaded through housing 65, is splined to a vertical rib 84 of the bellows housing.

The system may be arranged for remote control or automatic adjustment of the governing speed by addition of the bellows 85 shown in Fig.

4. This addition is effected by removing the manual adjusting element of Fig. 3, namely, plate 80 carrying wing bolt 81, and substituting therefor the bellows 85, by threading its stud 86 into bushing 82 of bellows 50, and by bolting its base member 87 onto the bellows assembly housing 65. As so disposed, the central stud 86 of bellows 85 may be raised or lowered by variation in hydrostatic pressure impressed on this bellows over inlet pipe 88. Since stud 86 is threaded into the bushing 82 of bellows 50, the bellows will move with stud 86 and will thus adjust the opening of valve 17 in accordance with the governing speed desired. Hydrostatic pressure in pipe 88 may be varied manually, as by turning a pressure knob on a control panel whereby remote governing speed adjustment is effected; or this pressure change may be made automatic in accordance with some factor of the engine driven system to be regulated, in the manner illustrated in Fig. 6 explained hereinafter. Or manual adjustment of the governing speed may be effected at the engine by rotation of knob 89 secured to the upper projecting end of stud 86.

In Fig. 3, valves 31 and 90 disposed in the pressure line extending from pumps 1 and 2, are of the temperature compensated orifice construction shown in Fig. 5. This valve comprises a cylindrical housing 91 of steel containing an orifice member 92 disposed between inlet and outlet passages 93, 94. Axially supported in the housing is a valve stem 95 of bronze having a needle point 96 projecting into the orifice of member 92. Due to the fact that the bronze stem has a higher coefficient of expansion than the steel housing, the stem will expand more than the housing as the oil heats up and will thus automatically increase the valve closure to compensate for reduction in viscosity or thinning out of the oil as the temperature increases and vice versa. By appropriately shaping the needle point 96 in relation to the temperature-viscosity characteristics of the oil employed, the valve will function automatically to offer the same resistance to the flow of oil therethrough irrespective of temperature.

Again reverting to Fig. 3, oil filters 97, 98 are provided in the pressure lines from the pumps. For indicating the governing speed in percentage of the full speed range of the engine, a pressure gauge 99 having a scale range of zero to one hundred, is connected to line 6 extending from pump 1.

Operation of the Fig. 3 system is essentially the same as that of Fig. 1. The governing speed is adjusted in the manner above described, and this determines the opening of timing valve 28 as explained. Assuming the engine is stabilized at the governing speed under a given load, and that the load is suddenly reduced, the engine will start to speed up thereby increasing the pressure in bellows 50, causing stem 16 of the regulating valve 18 to depress and increase the valve closure. Pressure will accordingly increase in the flexible pipe 35 and thus increase the pressure on the primary bellows 53 of the differential valve 19, causing its diaphragm to depress and open this valve at its lower closure 24 to apply pressure from pump 2 to the throttling valve bellows 55 and to the secondary bellows 54 of the differential valve. The throttling valve will accordingly start to close to reduce the fuel supply in accordance with portion AB of Fig. 2. Meantime, the throttling valve pressure is applied over pipe 40 directly to the lower section 52 of the compensating bellows and over pipe line 41 and through the timing valve 28 to the upper section thereof. Since the pressure builds up more rapidly in the lower section, the bellows assembly will at first move downward to back the orifice member 17 of the regulating valve away from the still advancing stem 16, and will thereafter restore the bellows assembly and orifice member 17 to their initial positions. The resultant action on the fuel supply will be as shown by portion BC of Fig. 2. As the engine passes its top speed 2, Fig. 2, the action above described will be reversed to vary the fuel supply in accordance with portion C—D—E of Fig. 2.

Bellows 54 of course operates to close valve 24 and to open valve 22 as required for maintaining the proper governing pressure in the throttling valve bellows 55. Pressure on bellows 54 is, during operation, always higher than that on bellows 53 owing to the smaller pressure area of the former. This permits the use of low operating pressures at the regulating valve 18, thereby reducing turbulence and providing smoother operation.

Fig. 6 shows diagrammatically at 99 the speed control system of Fig. 3 employing the remote control bellows 85 of Fig. 4, for so controlling the governing speed of a Diesel engine 100 driving a compressor 101, as to maintain a constant pressure in the discharge line 102 from the compressor. The control is effected by applying the pressure of the discharge line 102 through a small gauge pipe 103 to a Bourdon tube 104 of a pneumatic type pressure controller 105. The Bourdon tube terminates in a vane 106 arranged to impede the atmospheric escape through a nozzle 107 of compressed air supplied at constant pressure over a line 108. Bellows 85 of the control system is connected over pipe 109 to nozzle 107.

In the operation of this system, the escape of compressed air through nozzle 107 against vane 106, will create a back pressure in line 109 which, acting on bellows 85, will adjust the engine to the speed required to maintain the desired pressure in the compressor discharge line 102. Assuming the engine to be stabilized at a given speed corresponding to a given pressure in line 102, if this pressure should increase, the increased pressure would tend to make tube 104 unwind slightly, causing vane 106 to approach nozzle 107 more closely. The back pressure in line 109 will accordingly increase to increase the pressure on bellows 85, which, acting through the control system 99 in the manner above explained, will reduce the fuel supply to engine 100, thereby reducing its speed and hence the pressure in discharge line 102 to the control valve. Should the pressure in line 102 subsequently fall, vane 106 will move further away from nozzle 107, thus reducing the back pressure in line 109, thereby causing the engine to speed up until the pressure in line 102 is restored.

I claim:

1. An hydraulic speed control for prime movers, comprising: a first source of hydrostatic pressure varying as a continuous function of the prime mover speed, an auxiliary source of pressure, a throttling valve responsive to said auxiliary source, a speed regulating valve having closure and orifice members resiliently supported on pressure actuated diaphragms, means for causing one of said members to respond to variations in pressure of said first source for correspondingly varying hydrostatic pressure applied from said auxiliary source to said throttling valve, and means for causing the other of said members to respond to changes in pressure applied to said throttling valve from said auxiliary source for controlling the rate of change in pressure applied to said throttling valve.

2. An hydraulic speed control for prime movers, comprising: a first source of hydrostatic pressure varying as a continuous function of the prime mover speed, an auxiliary source of pressure, a throttling valve responsive to said auxiliary source, a speed regulating valve having closure and orifice members resiliently supported on pressure actuated diaphragms, means for causing one of said members to respond to alterations in pressure of said first source due to deviation of said speed from a selected governing speed for changing in a direction to restore said governing speed the hydrostatic pressure applied from said auxiliary source to said throttling valve, and means for causing the other of said members to respond to changes in pressure applied to said throttling valve from said auxiliary source for controlling the rate of change in pressure applied to said throttling valve.

3. An hydraulic speed control for prime movers, comprising: a first source of hydrostatic pressure varying as a continuous function of the prime moved speed, an auxiliary source of pressure, a throttling valve responsive to said auxiliary source, a speed regulating valve having closure and orifice members resiliently supported on pressure actuated diaphragms, means for causing one of said members to respond to alterations of said pressure due to deviation of said speed from a selected governing speed, for changing in a direction to restore said governing speed the hydrostatic pressure applied from said auxiliary source to said throttling valve, means for causing the other of said members to respond to changes in pressure applied to said throttling valve from said auxiliary source for controlling the rate of change in pressure applied to said throttling valve, and means for adjusting the closure of said regulating valve independently of said first pressure source for changing said governing speed.

4. An hydraulic speed control for prime movers, comprising: a first source of hydrostatic pressure varying as a continuous function of the prime mover speed, a throttling valve, an auxiliary pressure source, a differential valve responsive to said auxiliary source for applying pressure therefrom to said throttling valve, a speed regulating valve having resiliently supported closure and orifice members, means for causing one of said members to respond to alterations of said pressure due to deviation of said speed from a selected governing speed, for changing in a direction to restore said governing speed the hydrostatic pressure applied from an auxiliary source to said differential valve and through it to said throttling valve, and means for causing the other of said members to respond to changes in pressure applied to said throttling valve for reducing the rate of change of said pressure.

5. An hydraulic speed control for prime movers, comprising: a first source of hydrostatic pressure varying as a continuous function of the engine speed, a throttling valve, an auxiliary pressure source, a differential valve responsive to said auxiliary source for applying pressure therefrom to said throttling valve, a speed regulating valve having resiliently supported closure and orifice members, means for causing one of said members to respond to alternations of said pressure due to deviation of the prime mover speed from a selected governing speed, for changing in a direction to restore said governing speed the hydrostatic pressure applied from an auxiliary source to said differential valve and through it to said throttling valve, means for causing the other of said members to respond to changes in said throttling valve pressure for opposing such changes, and means responsive to said first pressure source for causing said opposition to increase with reduction in said governing speed.

6. An hydraulic speed control for prime movers, comprising: a first source of hydrostatic pressure increasing with the prime mover speed, a speed regulating valve having resiliently supported closure and orifice members, means for causing one of said members to respond to variations of said pressure for correspondingly varying hydrostatic pressure applied from an auxiliary source to a pressure actuated throttling valve, and means including a restricted orifice for causing the other of said members to respond to opposed components of the throttling valve pressure, a relatively unrestricted component directed to oppose changes in the throttling valve pressure, and an oppositely directed component applied through said restricted orifice.

7. An hydraulic speed control for prime movers, comprising: a first source of hydrostatic pressure increasing with the prime mover speed, a throttling valve, an auxiliary pressure source, a differential valve responsive to said auxiliary source for applying pressure therefrom to said throttling valve, a speed regulating valve having resiliently supported closure and orifice members, means for causing one of said members to respond to variations in pressure of said first source for correspondingly varying hydrostatic pressure applied from said auxiliary source to said differential valve and through it to said throttling valve, and means including a restricted orifice for causing the other of said members to respond to opposed components of the throttling valve pressure, a relatively unrestricted component directed to oppose changes in the throttling valve pressure, and an oppositely directed component applied through said restricted orifice.

8. An hydraulic speed control for prime movers, comprising: a first source of hydrostatic pressure increasing with the prime mover speed, a speed regulating valve having resiliently supported closure and orifice members, means for causing one of said members to respond to variations of said pressure for correspondingly varying hydrostatic pressure applied from an auxiliary source to a throttling valve, and means including a timing valve having a restricted orifice for causing the other of said members to respond to opposed components of the throttling valve pressure, a relatively unrestricted component directed to oppose changes in the throttling valve pressure, and an oppositely directed component applied through said restricted orifice of the timing valve, and means for causing said timing valve to respond to said first pressure source for increasing said orifice with engine speed.

9. An hydraulic speed control for prime movers, comprising: a first source of hydrostatic pressure increasing with the prime mover speed, a throttling valve, an auxiliary pressure source, a differential valve responsive to said auxiliary source for applying pressure therefrom to said throttling valve, a speed regulating valve having resiliently supported closure and orifice members, means for causing one of said members to respond to variations in pressure of said first source for correspondingly varying hydrostatic pressure applied from said auxiliary source to said differential valve and through it to said throttling valve, means including a timing valve having a restricted orifice for causing the other of said members to respond to opposed components of the throttling valve pressure, a relatively unrestricted component directed to oppose changes in the throttling valve pressure, and an oppositely directed component applied through said restricted orifice of the timing valve, and means for causing said timing valve to respond to said first pressure source for increasing said orifice with engine speed.

10. An hydraulic speed control system for prime movers, comprising: a first source of hydrostatic pressure increasing with the prime mover speed, an auxiliary pressure source, a pressure actuated throttling valve responsive to said auxiliary source, a speed regulating valve having resiliently supported closure and orifice members, means for causing one of said members to respond to deviations of said first source from a selected pressure corresponding to a selected governing speed, for altering in a direction to restore said governing speed the hydrostatic pressure applied from an auxiliary source to said throttling valve, and means including a timing valve having a restricted orifice for causing the other of said members to respond to opposed components of the throttling valve pressure, a relatively unrestricted component directed to oppose changes in the throttling valve pressure, and an oppositely directed component applied through said restricted orifice.

11. An hydraulic speed control system for prime movers, comprising: a first source of hydrostatic pressure increasing with the prime mover speed, a throttling valve, an auxiliary pressure source, a differential valve responsive to said auxiliary source for applying pressure therefrom to said throttling valve, a speed regulating valve having resiliently supported closure and orifice members, means for causing one said member to respond to deviations of said first source from a selected pressure corresponding to a selected governing speed, for altering in a direction to restore said governing speed the hydrostatic pressure applied from said auxiliary source to said differential valve and through it to said throttling valve, and means including a member having a restricted orifice for causing the other of said members to respond to opposed components of the throttling valve pressure, a relatively unrestricted component directed to oppose changes in the throttling valve pressure and an oppositely directed component applied through said restricted orifice.

12. An hydraulic speed control system for prime movers, comprising: a first source of hydrostatic pressure increasing with the prime mover speed, an auxiliary pressure source, a pressure actuated throttling valve responsive to said auxiliary source, a speed regulating valve having resiliently supported closure and orifice members, means for causing one of said members to respond to deviations of said first source from a selected pressure corresponding to a selected governing speed, for altering in a direction to restore said governing speed, the hydrostatic pressure applied from said auxiliary source to said throttling valve, means including a restricted orifice for causing the other of said members to respond to opposed components of the throttling valve pressure, a relatively unrestricted component directed to oppose changes in the throttling valve pressure and an oppositely directed component applied through said restricted orifice, and means for adjusting the closure of said speed regulating valve independently of said first source for changing said governing speed.

13. An hydraulic speed control system for prime movers, comprising: a first source of hydrostatic pressure increasing with the prime mover speed, an auxiliary pressure source, a pressure actuated throttling valve responsive to said auxiliary source, a speed regulating valve having resiliently supported closure and orifice members, means for causing one of said members to respond to deviations of said first source from a preselected pressure corresponding to a selected governing speed, for altering in a direction to restore said governing speed the hydrostatic pressure applied from said auxiliary source to said throttling valve, means including a timing valve having a restricted orifice for causing the other of said members to respond to opposed components of the throttling valve pressure, a relatively unrestricted component directed to oppose changes in the throttling valve pressure and an oppositely directed component applied through the restricted orifice of said timing valve, means for causing said timing valve to respond to said pressure of said first source for increasing the aperture of said orifice with increase in speed, and means for adjusting the closure of said regulating valve independently of said first source for changing said governing speed.

14. An hydraulic speed control system for prime movers, comprising: a first source of hydrostatic pressure increasing with the prime mover speed, an auxiliary pressure source, a pressure-actuated throttling valve responsive to said auxiliary source, a speed regulating valve having resiliently supported closure and orifice members, means for causing one of said members to respond to deviations of said first source from a selected pressure corresponding to a selected governing speed for altering in a direction to restore said governing speed the hydrostatic pressure applied from said auxiliary source to said throttling valve, means including a timing valve having a restricted orifice for causing the other of said members to respond to opposed components of the throttling valve pressure, a relatively unrestricted component directed to oppose changes in the throttling valve pressure and an oppositely directed component applied through the restricted orifice of said timing valve, means for causing said timing valve to respond to pressure of said first source for increasing the aperture of said orifice with increase in speed, and means for adjusting the closure of said speed regulating valve independently of said variable pressure source for changing said governing speed, the aperture of said timing valve orifice increasing with prime mover speed at a rate substantially to prevent hunting.

15. An hydraulic speed control system for prime movers, comprising: a first source of hydrostatic pressure increasing with the prime mover speed, an auxiliary pressure source, a pressure actuated throttling valve responsive to said auxiliary source, a speed regulating valve having resiliently supported closure and orifice members, means for causing one of said members to respond to deviations of said first source from a selected pressure corresponding to a selected governing speed, for altering in a direction to restore said regulation speed the hydrostatic pressure applied from said auxiliary source to said throttling valve, means including a timing valve having a restricted orifice for causing the other of said members to respond to opposed components of the throttling valve pressure, an unrestricted component directed to oppose changes in the throttling valve pressure and an oppositely directed component applied through the restricted orifice of said timing valve, said timing valve responding to said pressure of said first source for increasing the aperture of said orifice with increase of speed, and means responding to pressure applied from an external source for adjusting the closure of said speed regulating valve independently of said variable source for changing said governing speed.

16. In a hydraulic speed control system for prime movers: a first source of hydrostatic pressure which increases with the prime mover speed, means including a diaphragm-actuated, variable aperture, speed regulating valve responsive to and in accordance with said pressure, an auxiliary source of pressure, a variable aperture throttling valve, and means including a diaphragm-actuated differential valve responsive to said regulating valve for applying pressure from said auxiliary source to said throttling valve in accordance with the pressure on said regulating valve, said differential valve responding differentially to opposed pressure components of said auxiliary source, a component controlled by said regulating valve, and a component applied to said throttling valve.

17. In an hydraulic speed control system for prime movers: a first source of hydrostatic pressure which increases with the prime mover speed, means including a diaphragm-actuated, variable aperture speed regulating valve responsive to and in accordance with said pressure, an auxiliary source of hydrostatic pressure, means including a diaphragm-actuated, variable aperture throttling valve responsive to said auxiliary source, and means including a differential valve for adjusting the pressure applied to said throttling valve from said auxiliary source in accordance with the pressure applied to said regulating valve from said first source, said differential valve having a pair of valve actuating diaphragms for increasing and relieving the pressure respectively on said throttling valve.

PAUL A. CONDIT.